O. J. HARRINGTON.
Car Brake.
No. 41,917.
Patented Mar. 15, 1864.
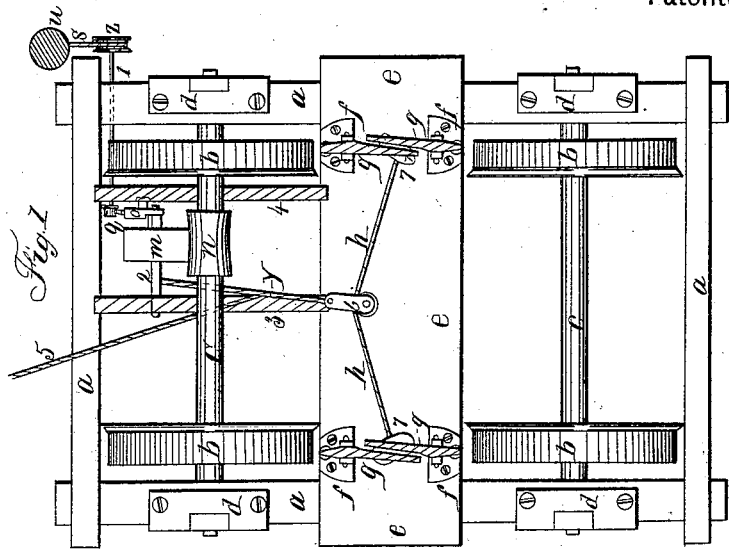
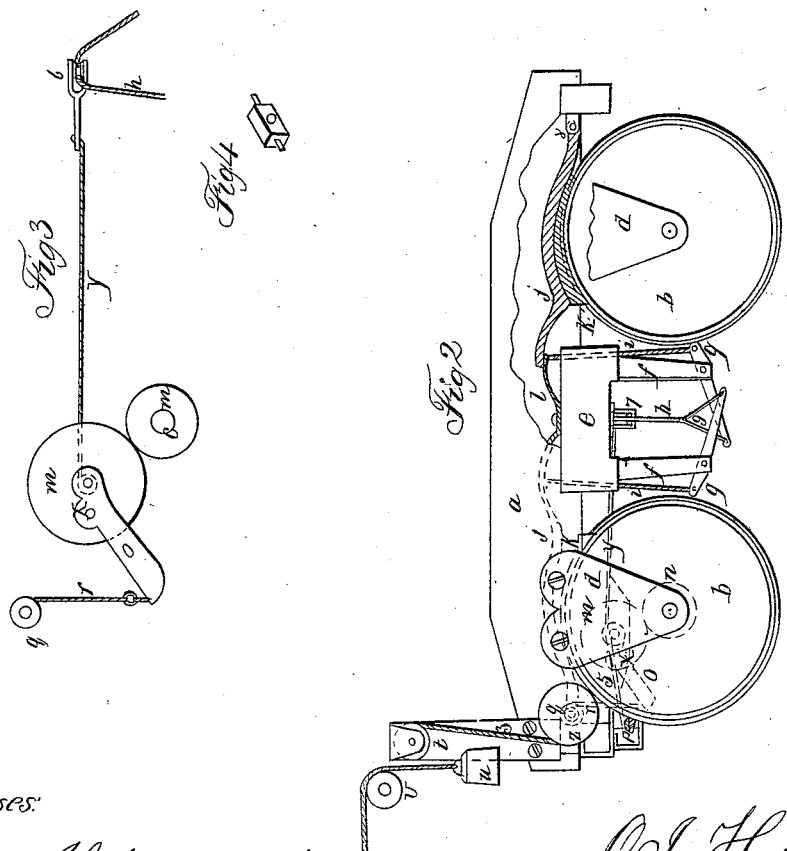
Witnesses:
James J. Johnston
John Davis
Inventor
O J Harrington

UNITED STATES PATENT OFFICE.

O. I. HARRINGTON, OF MANCHTER, PENNSYLVANIA.

IMPROVEMENT IN RAILROAD-CAR BRAKES.

Specification forming part of Letters Patent No. 41,917, dated March 15, 1864.

*To all whom it may concern:*

Be it known that I, O. I. HARRINGTON, of Manchester, in the county of Allegheny and State of Pennsylvania, have invented a new and useful Improvement in Brakes for Railroad-Cars; and I do hereby declare that the following is a full and exact description thereof, reference being had to the accompanying drawings, and to the letters of reference marked thereon.

The nature of my invention consists in an arrangement of levers, pulleys, chains, weights, and brakes, so arranged and combined that the brakes are made self-operative and their force brought to bear on the top of the wheels, the whole being arranged, combined, and operating in the manner hereinafter described.

In the accompanying drawings, Figure 1 represents a bottom view of an ordinary truck furnished with my improvement in brakes. Fig. 2 represents a side view of the same. Fig. 3 represents the drum, friction-pulley, chains, and the lever and chain used for operating the friction-pulley, and also represents the relative position of the friction-pulley and drum. Fig. 4 represents a swivel-bearing or journal-box, which is used in connection with lever $o$, shaft 2, and friction-pulley $m$.

In the accompanying drawings, $a$ represents the frame of the truck. $b$ represents the wheels. $c$ represents the axles of the wheels. $d$ represents the pedestals or bearings of the axles. The frame, wheels, axles, and pedestals are constructed in the ordinary way. Across the center of the frame $a$ is secured a timber, $e$, which is secured to the side pieces of the frame. To this timber $e$ is secured the hangers $f$, which are made in the form represented in Figs. 1 and 2. To these hangers $f$ are attached levers $g$, which are attached by means of chains $i$ to levers $j$, which are hinged to the frame $a$ at the point marked 8. To levers $j$ are attached the brakes $k$, which are held off from the wheels by means of the springs $l$. The long end of the levers $g$ are attached by means of links 9 to the chain $h$ which passes over pulleys 7, and through the pulley-block 6, which is attached to the chain or wire rope $y$, which is connected to the shaft 2 of the friction-pulley $m$.

One end of the shaft 2 has its bearing in the short end of lever $o$, the axis or fulcrum of which is secured to the bar 4 at the point marked $x$. The other end of shaft 2 is placed in a swivel-bearing placed in bar 3. The form of the swivel-bearing is clearly shown in Fig. 4. The arrangement of the swivel bearing in bar 3, and its operation, will be readily understood by any skillful mechanic without any further description.

To the long end of lever $o$ is attached a chain, $r$, which is attached to pulley $q$ on shaft 1, on the outer end of which is placed a pulley, $z$, to which is attached a cord, $s$, which passes over pulleys $t$ and $v$, placed on the side of the car-body, and is connected to the rope $s$ on the next car having like arrangement, and so on through the whole train. On the cord $s$, between the pulleys $t$ and $v$, is placed a weight, $u$. To the chain $y$ is attached a chain, 5, which is attached to the ordinary hand-lever. This chain is used when it is desired to operate the brakes by hand.

The operation of my improvement is as follows: Having all things arranged and constructed as herein described, with the long end of lever $o$ made heavy enough to raise one end of the shaft 2, so that the friction-pulley $m$ will be relieved from contact with the drum $n$, the cord $s$ is so arranged with relation to the cars that the first motion of the locomotive or the cars will draw on the cord $s$, which raises the weight $u$, which will let the long end of the lever $o$ drop down and thereby raise up the friction-pulley $m$ from off the drum $n$. It will readily be observed that by using long coupling-links for coupling the locomotive and cars together, and by running the cars and locomotive close together and making the cord $s$ taut, while the cars and locomotive are thus together, that their first action would be to draw the cord $s$ so as to raise the weight $u$. The brakes are thrown on by the cars coming together, which will cause the weight $u$ to drop down, which will raise the long end of lever $o$ by means of cord $s$, which will turn pulley $z$, which will turn shaft 1, which will revolve pulley $q$, which will wind up chain $r$, which will raise lever $o$, which will bring the friction-pulley $m$ in contact with drum $n$, which will revolve the friction-pulley $m$ and its shaft 2, which wind up the chain $y$, which will draw forward the chain $h$, which will by means of links 9 draw up the long end of levers $g$, which will cause the short end of levers to draw down the chains $i$, which will cause the levers $j$ to press the brakes $k$ down on the top of the wheels $b$. The brakes will be "taken off" by the forward motion of the locomotive and cars, which will raise the weight $u$, which will allow the lever $o$ to release the pulley $m$ from contact with the drum $n$, and the tension of the chains or ropes $y$ and $h$ will suddenly reverse the motion of the friction-pulley $m$ and shaft 2, which will slacken the ropes and levers, and the springs $l$ will raise the brakes $k$ from off the wheels.

I wish it clearly understood that I do not claim, broadly, the use of friction-pulleys for operating brakes. Neither do I claim placing brakes on the top of the wheels as being new, for both of these devices are well known; but What I do claim as of my invention is—

The combination of the cord $s$, weight $u$, friction-pulley $m$, drum $n$, shaft 2, levers $o$, $g$, and $j$, chains $y$, $h$, and $r$, pulleys 6, 7, $q$, $z$, $t$, and $v$, when used in connection with brakes $k$, each brake being operated by a separate lever and made self-operative by the means herein described and set forth.

O. I. HARRINGTON.

Witnesses:
JAMES J. JOHNSTON,
JOHN DAVIS.